United States Patent
Nakhaei Sarvedani et al.

(10) Patent No.: US 11,657,251 B2
(45) Date of Patent: May 23, 2023

(54) SYSTEM AND METHOD FOR MULTI-AGENT REINFORCEMENT LEARNING WITH PERIODIC PARAMETER SHARING

(71) Applicant: Honda Motor Co., Ltd., Tokyo (JP)

(72) Inventors: Alireza Nakhaei Sarvedani, Sunnyvale, CA (US); Kikuo Fujimura, Palo Alto, CA (US); Safa Cicek, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 750 days.

(21) Appl. No.: 16/680,395

(22) Filed: Nov. 11, 2019

(65) Prior Publication Data

US 2020/0151564 A1   May 14, 2020

Related U.S. Application Data

(60) Provisional application No. 62/759,957, filed on Nov. 12, 2018.

(51) Int. Cl.
    *G06V 10/764*   (2022.01)
    *G06N 3/08*     (2023.01)
    *G06N 3/04*     (2023.01)

(52) U.S. Cl.
    CPC ............ *G06N 3/08* (2013.01); *G06N 3/0454* (2013.01)

(58) Field of Classification Search
    CPC ...... G06N 3/0445; G06N 3/08; G06N 3/0454; G06N 3/006; G06N 3/084; G06N 3/02;
    (Continued)

(56) References Cited

U.S. PATENT DOCUMENTS

2018/0314266 A1* 11/2018 Shalev-Shwartz .......................... B60W 30/18163
2019/0084151 A1*  3/2019 Bai .......................... B25J 9/1612
(Continued)

FOREIGN PATENT DOCUMENTS

CN    111898211 A  * 11/2020  ............. G06F 30/15
CN    113561995 A  * 10/2021

OTHER PUBLICATIONS

Bahram, M., Lawitzky, A., Friedrichs, J., Aeberhard, M., and Wollherr, D. (2016). A game-theoretic approach to replanning-aware interactive scene prediction and planning. IEEE Transactions on Vehicular Technology, 65(6):3981-3992.
(Continued)

*Primary Examiner* — Masum Billah
(74) *Attorney, Agent, or Firm* — Rankin, Hill & Clark LLP

(57) ABSTRACT

A system and method for multi-agent reinforcement learning with periodic parameter sharing that include inputting at least one occupancy grid to a convolutional neural network (CNN) and at least one vehicle dynamic parameter into a first fully connected layer and concatenating outputs of the CNN and the first fully connected layer. The system and method also include providing Q value estimates for agent actions based on processing of the concatenated outputs and choosing at least one autonomous action to be executed by at least one of: an ego agent and a target agent. The system and method further include processing a multi-agent policy that accounts for operation of the ego agent and the target agent with respect to one another within a multi-agent environment based on the at least one autonomous action to be executed by at least one of: the ego agent and the target agent.

20 Claims, 6 Drawing Sheets

(58) Field of Classification Search
CPC ...... G06N 3/0481; G06N 3/049; G06N 3/126; G06N 7/005
USPC .......................................................... 706/2
See application file for complete search history.

(56) References Cited

U.S. PATENT DOCUMENTS

2020/0033869 A1* 1/2020 Palanisamy ......... B60W 60/001
2020/0175364 A1* 6/2020 Xu ........................... G06N 3/04

OTHER PUBLICATIONS

Hochreiter, S. and Schmidhuber, J. (1997). Long short-term memory. Neural computation, 9(8):1735-1780.

Bansal, T., Pachocki, J., Sidor, S., Sutskever, I., and Mordatch, I. (2017). Emergent complexity via multi-agent competition. arXiv preprint arXiv:1710.03748.

Da Silva, F. L. and Costa, A. H. R. (2018). Object-oriented curriculum generation for reinforcement learning. In International Conference on Autonomous Agents and Multiagent Systems (AAMAS).

Foerster, J., Assael, I. A., de Freitas, N., and Whiteson, S. (2016). Learning to communicate with deep multi-agent reinforcement learning. In Advances in Neural Information Processing Systems, pp. 2137-2145.

Foerster, J., Farquhar, G., Afouras, T., Nardelli, N., and Whiteson, S. (2017a). Counterfactual multi-agent policy gradients. arXiv preprint arXiv:1705.08926.

Foerster, J., Nardelli, N., Farquhar, G., Afouras, T., Torr, P. H., Kohli, P., and Whiteson, S. (2017b). Stabilising experience replay for deep multi-agent reinforcement learning. arXiv preprint arXiv:1702.08887.

Fortunato, M., Azar, M. G., Piot, B., Menick, J., Osband, I., Graves, A., Mnih, V., Munos, R., Hassabis, D., Pietquin, O., et al. (2017). Noisy networks for exploration. arXiv preprint arXiv:1706.10295.

Gupta, J. K., Egorov, M., and Kochenderfer, M. (2017). Cooperative multi-agent control using deep reinforcement learning. In International Conference on Autonomous Agents and Multiagent Systems, pp. 66-83. Springer.

Hasselt, H. V. (2010). Double q-learning. In Advances in Neural Information Processing Systems, pp. 2613-2621.

Hausknecht, M. and Stone, P. (2015). Deep recurrent q-learning for partially observable mdps. CoRR, abs/1507.06527.

Hessel, M., Modayil, J., Van Hasselt, H., Schaul, T., Ostrovski, G., Dabney, W., Horgan, D., Piot, B., Azar, M., and Silver, D. (2017). Rainbow: Combining improvements in deep reinforcement learning. arXiv preprint arXiv:1710.02298.

Hong, Z.-W., Su, S.-Y., Shann, T.-Y., Chang, Y.-H., and Lee, C.-Y. (2018). A deep policy inference q-network for multi-agent systems. In Proceedings of the 17th International Conference on Autonomous Agents and MultiAgent Systems, pp. 1388-1396. International Foundation for Autonomous Agents and Multiagent Systems.

Jaderberg, M., Czarnecki, W. M., Dunning, I., Marris, L., Lever, G., Castaneda, A. G., Beattie, C., Rabinowitz, N. C., Morcos, A. S., Ruderman, A., et al. (2018). Human-level performance in first-person multiplayer games with population-based deep reinforcement learning. arXiv preprint arXiv:1807.01281.

Lakshminarayanan, A. S., Sharma, S., and Ravindran, B. (2017). Dynamic action repetition for deep reinforcement learning. In AAAI, pp. 2133-2139.

Lange, S. and Riedmiller, M. (2010). Deep auto-encoder neural networks in reinforcement learning. In Neural Networks (IJCNN), The 2010 International Joint Conference on, pp. 1-8. IEEE.

LaValle, S. M. (2006). Planning algorithms. Cambridge university press.

Leibo, J. Z., Zambaldi, V., Lanctot, M., Marecki, J., and Graepel, T. (2017). Multi-agent reinforcement learning in sequential social dilemmas. In Proceedings of the 16th Conference on Autonomous Agents and MultiAgent Systems, pp. 464-473. International Foundation for Autonomous Agents and Multiagent Systems.

Lillicrap, T. P., Hunt, J. J., Pritzel, A., Heess, N., Erez, T., Tassa, Y., Silver, D., and Wierstra, D. (2015). Continuous control with deep reinforcement learning. arXiv preprint arXiv:1509.02971.

Lowe, R., Wu, Y., Tamar, A., Harb, J., Abbeel, O. P., and Mordatch, I. (2017). Multi-agent actor-critic for mixed cooperative-competitive environments. In Advances in Neural Information Processing Systems, pp. 6379-6390.

Mnih, V., Kavukcuoglu, K., Silver, D., Rusu, A. A., Veness, J., Bellemare, M. G., Graves, A., Riedmiller, M., Fidjeland, A. K., Ostrovski, G., et al. (2015). Human-level control through deep reinforcement learning Nature, 518(7540):529.

Mordatch, I. and Abbeel, P. (2017). Emergence of grounded compositional language in multi-agent populations. arXiv preprint arXiv:1703.04908.

Mukadam, M., Cosgun, A., Nakhaei, A., and Fujimura, K. (2017). Tactical decision making for lane changing with deep reinforcement learning.

Omidshafiei, S., Pazis, J., Amato, C., How, J. P., and Vian, J. (2017). Deep decentralized multi-task multi-agent reinforcement learning under partial observability. arXiv preprint arXiv:1703.06182.

Palmer, G., Tuyls, K., Bloembergen, D., and Savani, R. (2018). Lenient multi-agent deep reinforcement learning. In Proceedings of the 17th International Conference on Autonomous Agents and MultiAgent Systems, pp. 443-451. International Foundation for Autonomous Agents and Multiagent Systems.

Phan, T., Belzner, L., Gabor, T., and Schmid, K. (2018). Leveraging statistical multi-agent online planning with emergent value function approximation. arXiv preprint arXiv:1804.06311.

Riedmiller, M. (2005). Neural fitted q iteration—first experiences with a data efficient neural reinforcement learning method. In European Conference on Machine Learning, pp. 317-328. Springer.

Roderick, M., Grimm, C., and Tellex, S. (2018). Deep abstract q-networks. In Proceedings of the 17th International Conference on Autonomous Agents and MultiA-gent Systems, pp. 131-138. International Foundation for Autonomous Agents and Multiagent Systems.

Schaul, T., Quan, J., Antonoglou, I., and Silver, D. (2015). Prioritized experience replay. arXiv preprint arXiv:1511.05952.

Schulman, J., Levine, S., Abbeel, P., Jordan, M., and Moritz, P. (2015). Trust region policy optimization. In International Conference on Machine Learning, pp. 1889-1897.

Shalev-Shwartz, S., Shammah, S., and Shashua, A. (2016). Safe, multi-agent, reinforcement learning for autonomous driving. arXiv preprint arXiv:1610.03295.

Silver, D., Lever, G., Heess, N., Degris, T., Wierstra, D., and Riedmiller, M. (2014). Deterministic policy gradient algorithms. In ICML.

Tampuu, A., Matiisen, T., Kodelja, D., Kuzovkin, I., Korjus, K., Aru, J., Aru, J., and Vicente, R. (2017). Multiagent cooperation and competition with deep reinforcement learning. PloS one, 12(4):e0172395.

Tesauro, G. (2004). Extending q-learning to general adaptive multi-agent systems. In Advances in neural information processing systems, pp. 871-878.

Wang, Y., Lu, W., Hao, J., Wei, J., and Leung, H.-F. (2018). Efficient convention emergence through decoupled reinforcement social learning with teacher-student mechanism. In Proceedings of the 17th International Conference on Autonomous Agents and MultiAgent Systems, pp. 795-803. International Foundation for Autonomous Agents and Multiagent Systems.

* cited by examiner

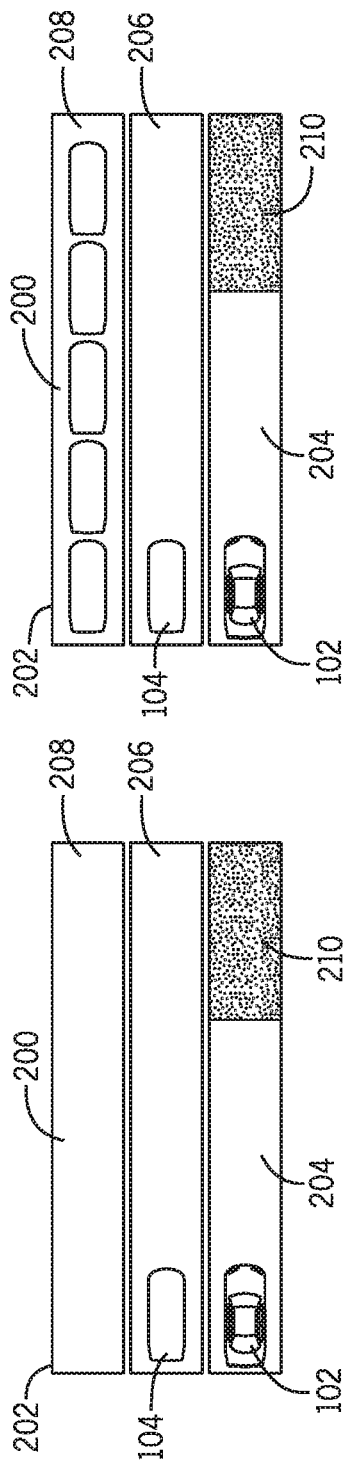
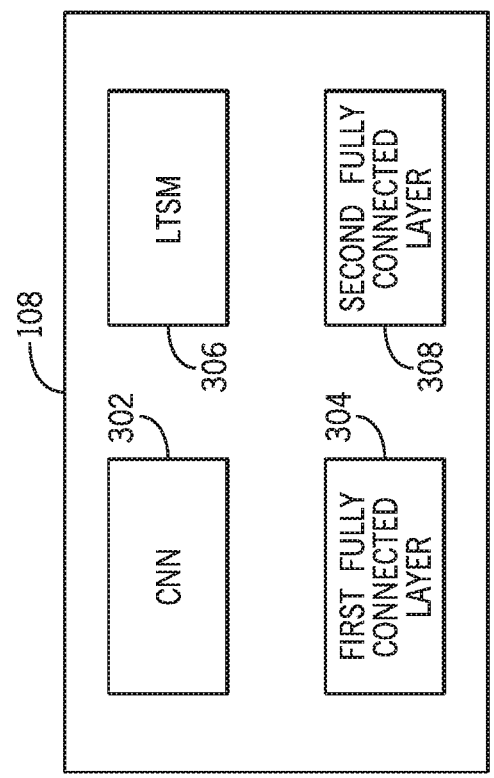

US 11,657,251 B2

SYSTEM AND METHOD FOR MULTI-AGENT REINFORCEMENT LEARNING WITH PERIODIC PARAMETER SHARING

CROSS-REFERENCE TO RELATED APPLICATION

This application claims priority to U.S. Provisional Application Ser. No. 62/759,957 filed on Nov. 12, 2018, which is expressly incorporated herein by reference.

BACKGROUND

Multi-robot navigation and autonomous driving applications such as highway merging, four-way stops, and lane changing are examples of situations where interaction is required between multiple mobile agents. For example, two mobile agents may be attempting to make maneuvers that may cross each other's paths when making lane changes. Markov Decision Processes (MDPs) are a natural framework for formulating sequential decision problems. However, using such motion planning models may limit observations of each agent to a certain range. Also, the ego-centric setting of a highway scenario may not be formulated as a Markov decision process due to a limited observability range.

BRIEF DESCRIPTION

According to one aspect, a computer-implemented method for multi-agent reinforcement learning with periodic parameter sharing that includes inputting at least one occupancy grid to a convolutional neural network (CNN) and at least one vehicle dynamic parameter into a first fully connected layer. The at least one occupancy grid and the at least one vehicle dynamic parameter are associated with at least one of: an ego agent and a target agent. The computer-implemented method also includes concatenating outputs of the CNN and the first fully connected layer. The concatenated outputs of the first fully connected layer and the CNN are inputted into a long short-term memory unit (LSTM). The computer-implemented method additionally includes providing Q value estimates for agent actions based on processing of the concatenated outputs and choosing at least one autonomous action to be executed by at least one of: the ego agent and the target agent. The computer-implemented method further includes processing a multi-agent policy that accounts for operation of the ego agent and the target agent with respect to one another within a multi-agent environment based on the at least one autonomous action to be executed by at least one of: the ego agent and the target agent.

According to another aspect, a system for multi-agent reinforcement learning with periodic parameter sharing that includes a memory storing instructions when executed by a processor cause the processor to input at least one occupancy grid to a convolutional neural network (CNN) and at least one vehicle dynamic parameter into a first fully connected layer. The at least one occupancy grid and the at least one vehicle dynamic parameter are associated with at least one of: an ego agent and a target agent. The instructions also cause the processor to concatenate outputs of the CNN and the first fully connected layer. The concatenated outputs of the first fully connected layer and the CNN are inputted into a long short-term memory unit (LSTM). The instructions additionally cause the processor to provide Q value estimates for agent actions based on processing of the concatenated outputs and choose at least one autonomous action to be executed by at least one of: the ego agent and the target agent. The instructions further cause the processor to process a multi-agent policy that accounts for operation of the ego agent and the target agent with respect to one another within a multi-agent environment based on the at least one autonomous action to be executed by at least one of: the ego agent and the target agent.

According to yet another aspect, a non-transitory computer readable storage medium storing instructions that when executed by a computer, which includes a processor perform a method, the method includes inputting at least one occupancy grid to a convolutional neural network (CNN) and at least one vehicle dynamic parameter into a first fully connected layer. The at least one occupancy grid and the at least one vehicle dynamic parameter are associated with at least one of: an ego agent and a target agent. The method also includes concatenating outputs of the CNN and the first fully connected layer. The concatenated outputs of the first fully connected layer and the CNN are inputted into a long short-term memory unit (LSTM). The method additionally includes providing Q value estimates for agent actions based on processing of the concatenated outputs and choosing at least one autonomous action to be executed by at least one of: the ego agent and the target agent. The method further includes processing a multi-agent policy that accounts for operation of the ego agent and the target agent with respect to one another within a multi-agent environment based on the at least one autonomous action to be executed by at least one of: the ego agent and the target agent.

BRIEF DESCRIPTION OF THE DRAWINGS

FIG. 2A is an illustrative example of an ego agent and a target agent that are traveling in a multi-agent environment according to an exemplary embodiment of the present disclosure;

FIG. 2B is another illustrative example of the ego agent and the target agent that are traveling in a multi-agent environment according to an exemplary embodiment of the present disclosure;

FIG. 3 is a schematic view of neural network configurations of a neural network infrastructure according to an exemplary embodiment of the present disclosure;

DETAILED DESCRIPTION

Figure 1:
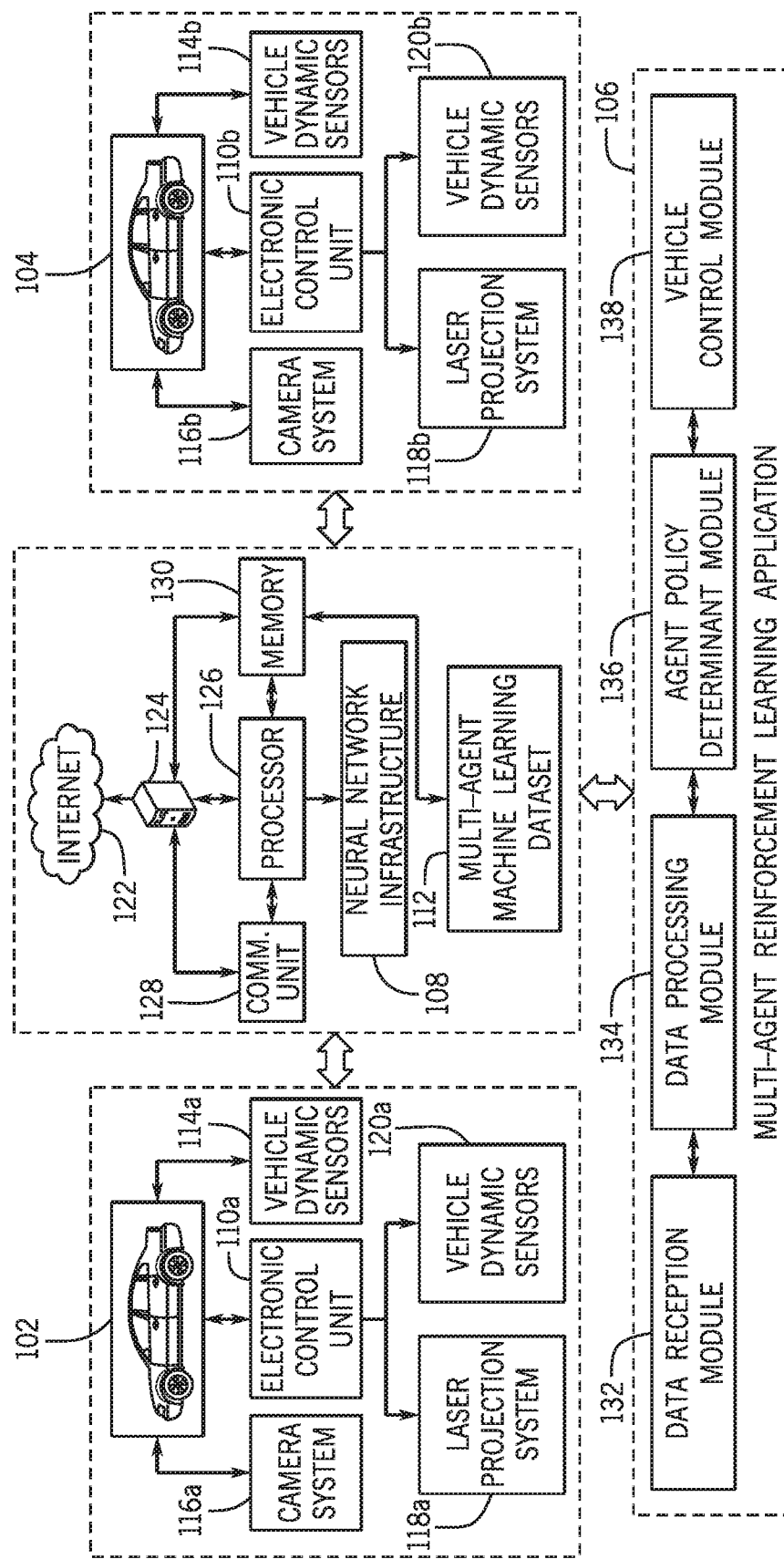
FIG. 1 is a schematic view of an exemplary system for multi-agent reinforcement learning with periodic parameter sharing according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for multi-agent reinforcement learning with periodic parameter sharing according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego agent 102 and a target agent 104. For purposes of simplicity, this disclosure will describe the embodiments of the system 100 with respect to a single ego agent 102 and a single target agent 104. However, it is appreciated that the system 100 may include more than one ego agent 102 and more than one target agent 104 and that the embodiments and processes discussed herein may be utilized in an environment that includes one or more ego agents 102 and one or more target agents 104.

As shown in the illustrative example of FIG. 2A, the ego agent 102 and the target agent 104 may be traveling in a multi-agent environment 200. In particular, the ego agent 102 and the target agent 104 may be traveling within adjacent lanes 204, 206 of a roadway 202 of the multi-agent environment 200. The ego agent 102 and the target agent 104 may be traveling in respective directions and in locations that are within a particular distance of one another. In this scenario, to allow the ego agent 102 to avoid a static obstacle 210 that is located within the lane 204 in which the ego agent 102 is traveling, the target agent 104 may have to change lanes to a left most lane 208 of the roadway 202 to accommodate the ego agent 102 changing lanes from its current lane 204 to the adjacent lane 206. This may be possible since the lane 208 is unoccupied in a surrounding vicinity which may thereby allow the target agent 104 to merge to the lane 208 to allow the ego agent 102 to merge to the lane 206.

As shown in the illustrative example of FIG. 2B, in a scenario in which the lane 208 is occupied and may thereby not allow the target agent 104 to change lanes to accommodate the lane change of the ego agent 102, the ego agent 102 may need to determine that the target agent 104 may not be able to change lanes and thereby may determine an autonomous driving control (e.g., braking amount, steering angle, acceleration amount) that may be applied to allow the ego agent 102 to allow the target agent 104 to pass the ego agent 102. This may thereby allow the ego agent 102 to merge in the lane 206 of the roadway 202 to avoid the static obstacle 210. In an exemplary embodiment, a multi-agent reinforcement learning application 106 (multi-agent application) may provide interaction-aware planning to exhibit cooperative behaviors in similar multi-agent environment scenarios as presented in the illustrative examples of FIG. 2A and FIG. 2B.

With reference to FIG. 1, in particular, the multi-agent application 106 may be configured to allow agents such as the ego agent 102 and the target agent 104 to predict each other's trajectories, collaborate, and consider their proactive impact in the future state of others. As discussed in more detail below, the multi-agent application 106 may configured to execute computer-implemented instructions that allow parameters of the ego agent 102 to be shared with the target agent 104 and other agents. Such parameters may be determined based on machine learning/deep learning of various data that is executed to provide artificial intelligence capabilities to simulate various multi-agent driving scenarios. The parameters of the ego agent 102 and the target agent 104 may be influenced based on actions that are output based on the various multi-agent driving scenarios to autonomously control the ego agent 102 and/or the target agent 104 to allow the ego agent 102 and/or the target agent 104 to maximize their respective objectives as if a moving environment in which the ego agent 102 and the target agent 104 are fixed (i.e., the policies of additional agents are not changing).

In one embodiment, the multi-agent application 106 may enable the ego agent 102 and the target agent 104 to cooperate with one another and/or additional agents within the surrounding multi-agent environment of the agents 102, 104. Accordingly, each of the agents 102, 104 may be autonomously controlled based on one or more multi-agent policies that include one or more determined autonomous actions that are respectively implemented to allow the agents 102, 104 to determine an understanding of static objects, dynamic objects, lane configuration, travel path configuration, and the like that is part of the surrounding multi-agent environment of the agents 102, 104. Additionally, the multi-agent policy may allow each of the agents 102, 104 to be autonomously controlled based on an estimation of one another's trajectories, vehicle dynamics, and/or proactive maneuvers. The multi-agent policy may be processed based on periodic parameter sharing which is related to updating a machine learning dataset, discussed below, that may allow the ego agent 102 and the target agent 104 to execute one or more multi-agent policies that take each other into account within the surrounding multi-agent environment of the agents 102, 104. The one or more multi-agent policies may thereby enable the ego agent 102 and/or the target agent 104 to be autonomously operated based on one or more selected autonomous actions to successfully navigate the respective agent 102, 104 within the surrounding multi-agent environment of the agents 102, 104.

With continued reference to FIG. 1, the ego agent 102 and the target agent 104 may include respective electronic control devices (ECUs) 110a, 110b. The ECUs 110a, 110b may execute one or more applications, operating systems, vehicle system and subsystem executable instructions, among others. In one or more embodiments, the ECUs 110a, 110b may include a respective microprocessor, one or more application-specific integrated circuit(s) (ASIC), or other similar devices. The ECUs 110a, 110b may also include respective internal processing memory, an interface circuit, and bus lines for transferring data, sending commands, and communicating with the plurality of components of the ego agent 102 and/or the target agent 104.

The ECUs 110a, 110b may also include a respective communication device (not shown) for sending data internally to components of the respective agents 102, 104 and communicating with externally hosted computing systems (e.g., external to the agents 102, 104). Generally, the ECUs 110a, 110b communicate with respective storage units 114a, 114b to execute the one or more applications, operating systems, vehicle systems and subsystem user interfaces, and the like that are stored within the respective storage units 114a, 114b.

In some embodiments, the storage units 114a, 114b may respectively store single agent polices that may be processed for each of the respective agents 102, 104. Accordingly, the application 106 may store the respective single agent policies to be followed by the respective agents 102, 104 that may be shared and stored within a multi-agent machine learning dataset 112 to be further aggregated or modified into multi-agent policies that may be utilized by the ego agent 102 and/or the target agent 104 during one or more real-world driving scenarios.

In an exemplary embodiment, the ECUs 110a, 110b may be configured to operably control the plurality of components of the respective agents 102, 104. The ECUs 110a, 110b may additionally provide one or more commands to one or more control units (not shown) of the agents 102, 104 including, but not limited to a respective engine control unit, a respective braking control unit, a respective transmission control unit, a respective steering control unit, and the like to control the ego agent 102 and/or target agent 104 to be autonomously operated.

In an exemplary embodiment, one or both of the ECU 110a, 110b may autonomously control the ego agent 102 and/or the target agent 104 based on one or more multi-agent policies that are determined by the multi-agent application 106 and stored on the multi-agent machine learning dataset 112. As discussed below, each multi-agent policy may include dynamic parameters that may be implemented by respective agents 102, 104 within a real-world environment that may match (e.g., with respect to one or more attributes) a simulated surrounding multi-agent environment of the agents 102, 104.

The storage units 114a, 114b operably connected to the ECUs 110a, 110b may be configured to store one or more executable files associated with one or more operating systems, applications, associated operating system data, application data, vehicle system and subsystem user interface data, and the like that are executed by the respective ECUs 110a, 110b. In one or more embodiments, the storage units 114a, 114b may be accessed by the multi-agent application 106 to store data, for example, one or more images, videos, one or more sets of image coordinates, one or more sets of LiDAR coordinates (e.g., LiDAR coordinates associated with the position of an object), one or more sets of locational coordinates (e.g., GPS/DGPS coordinates) and/or vehicle dynamic data associated respectively with the ego agent 102 and the target agent 104. In some embodiments, the storage units 114a, 114b may be configured to store a respective single agent policy or multi agent policy that may apply to the respective agent 102, 104 and/or both agents 102, 104.

In an exemplary embodiment, the ECUs 110a, 110b may be operably connected to vehicle dynamic sensors 120a, 120b of the ego agent 102 and the target agent 104. The vehicle dynamic sensors 120a, 120b may be configured to output one or more categories of vehicle dynamic data to the ECUs 110a, 110b and the multi-agent application 106. The vehicle dynamic sensors 120a, 120b may include, but may not be limited to, speed sensors, brake force sensors, steering speed sensors, steering angle sensors, throttle angle sensors, accelerometers, wheel speed sensors, wheel turning angle sensors, yaw rate sensors, transmission gear sensors, temperature sensors, RPM sensors, and the like (individual sensors not shown).

In one embodiment, the multi-agent application 106 may be configured to receive vehicle dynamic data from the vehicle dynamic sensors 120a of the ego agent 102 for a predetermined period of time. Additionally, the multi-agent application 106 may be separately configured to receive vehicle dynamic data from the vehicle dynamic sensors 120b of the target agent 104 for a predetermined period of time. The vehicle dynamic data may include, but may not be limited to, vehicle speed data, vehicle brake force data, vehicle steering speed data, vehicle steering angle data, vehicle throttle angle data, vehicle acceleration data, and the like. As discussed below, upon receipt of the vehicle dynamic data, such data may be packaged and inputted to a neural network infrastructure 108 to be processed.

The ECUs 110a, 110b may be additionally configured to operably control respective camera systems 116a, 116b of the ego agent 102 and the target agent 104. The camera systems 116a, 116b may include one or more cameras that are positioned at one or more exterior portions of the respective agents 102, 104. The camera(s) of the camera systems 116a, 116b may be positioned in a direction to capture the surrounding multi-agent environment of the respective agents 102, 104 that includes a predetermined area located around (front/sides/behind) the respective agents 102, 104 that includes the multi-agent environment 200.

In one or more configurations, the one or more cameras of the respective camera systems 116a, 116b may be disposed at external front, rear, and/or side portions of the respective agents 102, 104 including, but not limited to different portions of the bumpers, lighting units, fenders/body panels, and/or windshields. The one or more cameras may be positioned on a respective planar sweep pedestal (not shown) that allows the one or more cameras to be oscillated to capture images of the surrounding environments of the respective agents 102, 104.

With respect to the ego agent 102, the multi-agent application 106 may receive image data associated with untrimmed images/video of the surrounding multi-agent environment of the ego agent 102 from the camera system 116a and may execute image logic to analyze the image data and determine ego agent image based observations associated with the surrounding multi-agent environment, the target agent 104 that may be located within the multi-agent environment, one or lanes (pathways) within the multi-agent environment, and/or one or more objects (not shown) that may be located within the multi-agent environment.

With respect to the target agent 104, the multi-agent application 106 may receive image data associated with untrimmed images/video of the surrounding multi-agent environment of the target agent 104 from the camera system 116b and may execute image logic to analyze the image data and determine target agent image based observations associated with the multi-agent environment, the ego agent 102 that may be located within the multi-agent environment, one or lanes (pathways) within the multi-agent environment, and/or one or more objects (not shown) that may be located within the multi-agent environment.

As discussed below, upon receipt of the image data from the camera system 116a of the surrounding multi-agent environment of the ego agent 102, such data may be packaged and inputted to the neural network infrastructure 108 to be processed. Additionally, upon receipt of the image data from the camera system 116b of the surrounding multi agent environment of the target agent 104, such data may be packaged and inputted to the neural network infrastructure 108 to be processed.

In one or more embodiments, the ECUs 110a, 110b may also be operably connected to respective laser projection systems 118a, 118b that may include one or more respective LiDAR transceivers (not shown). The one or more respective LiDAR transceivers of the respective laser projection systems 118a, 118b may be disposed at respective external front, rear, and/or side portions of the respective agents 102, 104, including, but not limited to different portions of bumpers, body panels, fenders, lighting units, and/or windshields.

The one or more respective LiDAR transceivers may include one or more planar sweep lasers that include may be configured to oscillate and emit one or more laser beams of ultraviolet, visible, or near infrared light toward the surrounding environment of the respective agents 102, 104. The laser projection systems 118a, 118b may be configured to receive one or more reflected laser waves based on the one or more laser beams emitted by the LiDAR transceivers. The one or more reflected laser waves may be reflected off of one or more static objects, one or more dynamic objects, and/or one or more agents that are located within the multi-agent environment.

In an exemplary embodiment, the laser projection systems 118a, 118b may be configured to output LiDAR data associated to one or more reflected laser waves. With respect to the ego agent 102, the multi-agent application 106 may receive LiDAR data communicated by the laser projection system 118a and may execute LiDAR logic to analyze the LiDAR data and determine ego agent LiDAR based observations associated with the multi-agent environment, and more specifically the lane on which the ego agent 102 is traveling, additional lanes included within the multi-agent environment, the target agent 104 that may be located within the multi-agent environment, one or more static objects that may be located within the multi-agent environment, one or more dynamic objects that may be located within the multi-agent environment, and/or one or more additional agents that may be traveling within the surrounding multi-agent environment of the ego agent 102.

With respect to the target agent 104, the multi-agent application 106 may receive LiDAR data communicated by the laser projection system 118b and may execute LiDAR logic to analyze the LiDAR data and determine target agent LiDAR based observations associated with the multi-agent environment, and more specifically the lane on which the target agent 104 is traveling, additional lanes included within the multi-agent environment, the ego agent 102 that may be located within the multi-agent environment, one or more static objects that may be located within the multi-agent environment, one or more dynamic objects that may be located within the multi-agent environment, and/or one or more additional agents that may be traveling within the surrounding multi-agent environment of the target agent 104.

As discussed below, upon receipt of the LiDAR data from the laser projection system 118a of the surrounding multi-agent environment of the ego agent 102, such data may be packaged and inputted to the neural network infrastructure 108 to be processed. Additionally, upon receipt of the LiDAR data from the laser projection system 118b of the surrounding multi agent environment of the target agent 104, such data may be packaged and inputted to the neural network infrastructure 108 to be processed.

In one or more embodiments, the ego agent 102 and the target agent 104 may additionally include respective communication units (not shown) that may be operably controlled by the respective ECUs 110a, 110b of the respective agents 102, 104. The communication units may each be operably connected to one or more transceivers (not shown) of the respective agents 102, 104. The communication units may be configured to communicate through an internet cloud 122 through one or more wireless communication signals that may include, but may not be limited to Bluetooth® signals, Wi-Fi signals, ZigBee signals, Wi-Max signals, and the like. In some embodiments, the communication unit of the ego agent 102 may be configured to communicate via vehicle-to-vehicle (V2V) with the communication unit of the target agent 104 to exchange information about the position, speed, steering angles, acceleration rates, deceleration rates, and the like of the agents 102, 104 traveling within the multi-agent environment 200.

In one embodiment, the communication units may be configured to connect to the internet cloud 122 to send and receive communication signals to and from an externally hosted server infrastructure (external server) 124. The external server 124 may host the neural network infrastructure 108 and may execute the multi-agent application 106 to utilize processing power to provide for multi-agent reinforcement learning with periodic parameter sharing capabilities to operably control autonomous operation of the ego agent 102 and/or the target agent 104 based on one or more multi-agent policies.

In one or more embodiments, the neural network infrastructure 108 may include one or more types of neural network configurations (shown in FIG. 3). One or more types of neural networks may be trained at one or more time steps based on learning of one or more multi-agent policies that are associated with the ego agent 102 and/or the target agent 104 that are traveling within the multi-agent environment 200. The training of the neural network infrastructure 108 may allow the agents 102, 104 to receive data pertaining to real-time or similar multi-agent scenarios (e.g., ego agent 102 and target agent 104 located with respect to one another) that may occur within a multi-agent environment 200 to ensure that one or more policies are processed that may utilized by the ego agent 102 and/or the target agent 104 to simultaneously achieve respective goals (e.g., lane changing) in a cooperative non-conflicting manner while accounting for one another within the multi-agent environment 200.

In an exemplary embodiment, components of the external server 124 including the neural network infrastructure 108 may be operably controlled by a processor 126. The processor 126 may be configured to operably control the neural network infrastructure 108 to utilize machine learning/deep learning to provide artificial intelligence capabilities that may be utilized to build the multi-agent machine learning dataset 112.

Referring to FIG. 3, a schematic view of neural network configurations of the neural network infrastructure 108 according to an exemplary embodiment of the present disclosure. As shown, the neural network infrastructure 108 hosted on the external server 124 may include a convolutional neural network 302 (CNN), a first fully connected layer 304 that may be included as part of the CNN 302 or a separate convolutional neural network (not shown), a long short-term memory recurrent neural network 306 (LSTM), and a second fully connected layer 308 that may be included as part of the CNN 302 or a separate convolutional neural network.

In an exemplary embodiment, the CNN 302 may be configured to receive inputs in the form of data from the multi-agent application 106 and may flatten the data and concatenate the data to output information. In one embodiment, the CNN 302 may include fully connected layers. As discussed below, image data and LiDAR data may be processed into one or more occupancy grids of the surrounding multi-agent environment of the ego agent 102 and/or the target agent 104. Some of the layers of the CNN 302 may include perceptrons that may be configured to process the one or more occupancy grids that may be inputted to input layers of the CNN 302. Such processed data may include image and LiDAR coordinate data points associated with the location of the agents 102, 104, additional agents, static objects, dynamic objects, and other attributes associated with the surrounding multi-agent environment of the agents 102, 104 (e.g., roadways, curbs, etc.).

In one configuration, the first fully connected layer 304 may be configured to receive data from an input layer and may include perceptrons that may be configured to analyze numeric data parameters through machine learning/deep learning techniques and output processed data associated with the numeric data parameters (e.g., packaged data). As discussed below, the multi-agent application 106 may be configured to receive the vehicle dynamic data from the vehicle dynamic sensors 120a, 120b of the ego agent 102 and/or the target agent 104. Upon receiving the vehicle dynamic data, the multi-agent application 106 may be configured to process a vehicle dynamic state that may include a plurality of vehicle dynamic parameters of the respective agents 102, 104. The plurality of vehicle dynamic parameters of the respective agents 102, 104 may be respectively inputted to the first fully connected layer 304 to be processed. Accordingly, the first fully connected layer 304 may be configured to output processed data associated with the vehicle dynamic parameters.

In an exemplary embodiment, the LSTM 306 may be configured as an artificial recurrent neural network architecture. In one configuration, the LSTM may be configured to process data points that are inputted to the LSTM 306. The LSTM 306 may be configured to output classification and prediction based data associated with a time series. As discussed below, the multi-agent application 106 may be configured to concatenate the processed data that may include image and LiDAR coordinate data points output by the CNN 302 and the processed data associated with vehicle dynamic parameters output by the first fully connected layer 304 into agent environmental and dynamic data. The agent environmental and dynamic data may be inputted to the LSTM 306 to be further processed to recognize patterns in the agent environmental and dynamic data. The LSTM 306 may take time and sequence into account and therefore may output temporal classification data associated with the agent environmental and dynamic data.

In one or more embodiments, the second fully connected layer 308 may be configured to receive data from an input layer and may include perceptrons that may be configured to analyze data parameters through machine learning/deep learning techniques and output processed data associated with the numeric data parameters (e.g., packaged data). As discussed below, the temporal classification data associated with the agent environmental and dynamic data that is output from the LSTM 306 may be input to the second fully connected layer 308 by the multi-agent application 106. The second fully connected layer 308 may be configured to assign Q value estimates for each of the actions and output the Q value estimates that may be associated with various autonomous actions that may be implemented for a respective agent 102, 104.

In one or more embodiments the Q value estimates may be further ranked and utilized to determine a single agent policy respectively for the ego agent 102 and the target agent 104. In one embodiment, the single agent policies may be aggregated by the multi-agent application 106 to thereby process and learn the multi-agent policy that accounts for operation of the ego agent 102 and the target agent 104 with respect to one another within the multi-agent environment. In an alternative embodiment, the single agent policies may be modified by the multi-agent application 106 to thereby process and learn respective multi-agent policies that accounts for operation of the ego agent 102 and the target agent 104 with respect to one another within the multi-agent environment With continued reference to the external server 124, the processor 126 may be operably connected to a memory 130. The memory 130 may store one or more operating systems, applications, associated operating system data, application data, executable data, and the like. In one embodiment, the processor 126 may be configured to process information derived from one or more multi-agent policies learned by the application 106 at one or more time steps that may be utilized autonomously control the ego agent 102 and/or the target agent 104 in real-time within the multi-agent environment.

In one embodiment, the multi-agent machine learning dataset 112 may be configured as a dataset that includes one or more fields associated with each of the ego agent 102 and the target agent 104. The one or more fields may be configured to store single agent policies that may be associated with the ego agent 102 and the target agent 104 that may be processed at one or more points in time. The multi-agent machine learning dataset 112 may additionally be configured to include one or more fields that may be associated with multi-agent policies that may be applicable to both the ego agent 102 and the target agent 104. As discussed below, the multi-agent policies may be processed based on the multi-agent application 106 accessing the respective single agent policies that are respectively associated with the ego agent 102 and the target agent 104 and updating the policies of each of the vehicles to multi-agent policies that may be based on an aggregation of the single agent policies.

In one embodiment, the processor 126 of the external server 124 may additionally be configured to communicate with a communication unit 128. The communication unit 128 may be configured to communicate through the internet cloud 122 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 122 to send and receive communication signals to and from the ego agent 102 and/or the target agent 104. In particular, the external server 124 may receive image data, LiDAR data, and/or vehicle dynamic data that may be communicated by the ego agent 102 and/or the target agent 104 based on the utilization of the vehicle dynamic sensors 120a, 120b, one or more of the camera systems 116a, 116b, and/or the laser projection systems 118a, 118b. As discussed below, such data may be utilized to determine the one or more occupancy grids and one or more vehicle dynamic states that may be respectively inputted to the CNN 302 and the first fully connected layer 304 of the neural network infrastructure 108.

II. The Multi-Agent Reinforcement Learning Application and Related Methods

The components of the multi-agent application 106 will now be described according to an exemplary embodiment and with reference to FIG. 1. In an exemplary embodiment, the multi-agent application 106 may be stored on the memory 130 and executed by the processor 126 of the external server 124. In another embodiment, the multi-agent application 106 may be stored on the storage unit 114a of the ego agent 102 and may be executed by the ECU 110a of the ego agent 102. In some embodiments, in addition to be stored and executed by the external server 124 and/or by the ego agent 102, the application 106 may also be stored on the storage unit 114b of the target agent 104 and may be executed by the ECU 110b of the target agent 104.

The general functionality of the multi-agent application 106 will now be discussed. In an exemplary embodiment, the multi-agent application 106 may include a data reception module 132, a data processing module 134, an agent policy determinant module 136, and a vehicle control module 138. However, it is to be appreciated that the multi-agent application 106 may include one or more additional modules and/or sub-modules that are included in addition to the modules 132-138. Methods and examples describing process steps that are executed by the modules 132-138 of the multi-agent application 106 will now be described in more detail.

Figure 4:
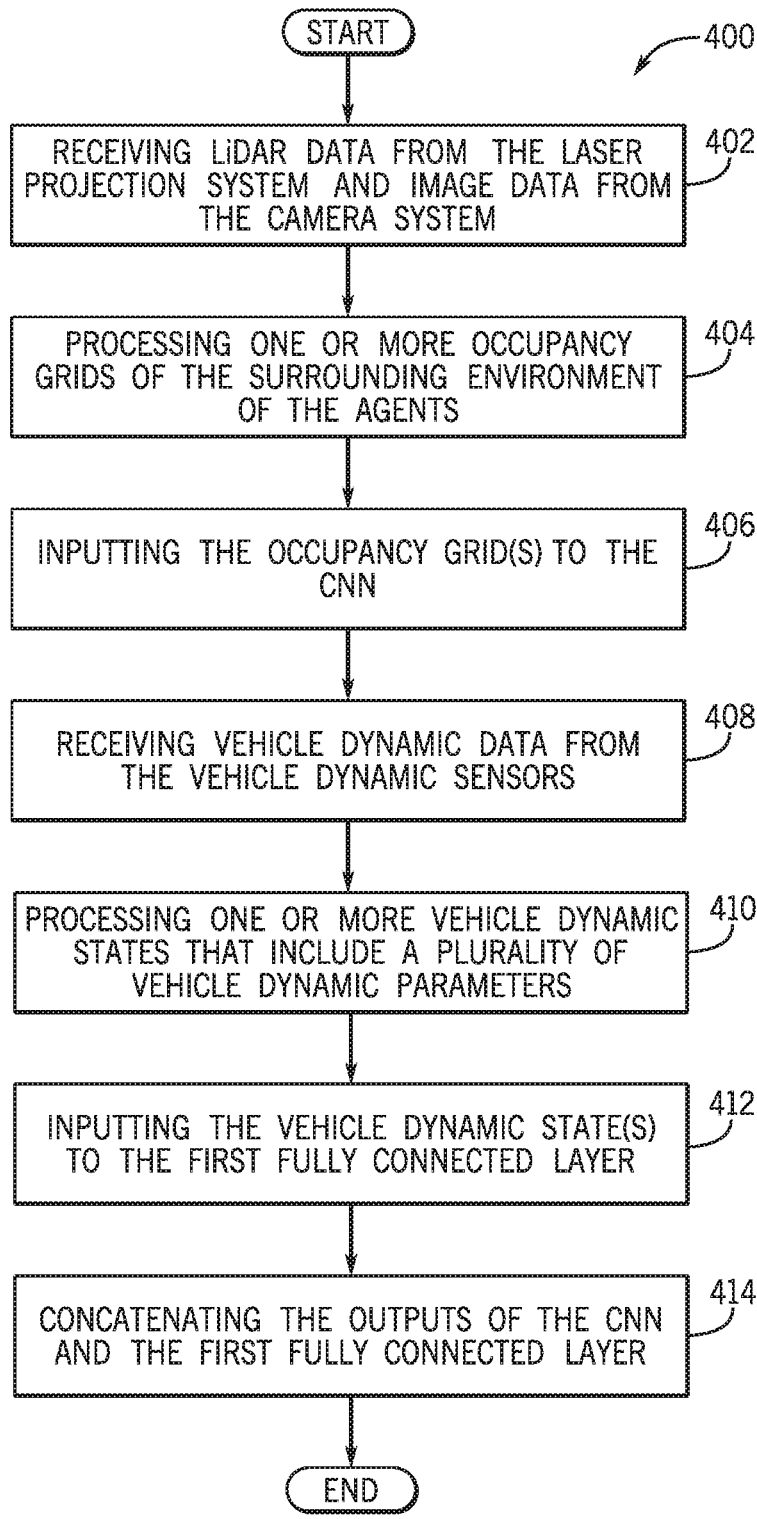
FIG. 4 is a process flow diagram of a method for concatenating processed data that includes image and LiDAR coordinate data points and processed data associated with vehicle dynamic parameters according to an exemplary embodiment of the present disclosure.

FIG. 4 is a process flow diagram of a method 400 for concatenating processed data that includes image and LiDAR coordinate data points and processed data associated with vehicle dynamic parameters according to an exemplary embodiment of the present disclosure. FIG. 4 will be described with reference to the components of FIG. 1, FIG.

2, and FIG. 3, though it is to be appreciated that the method of FIG. 4 may be used with other systems/components. It is to be appreciated that the multi-agent application 106 may execute the method 400 for each of the ego agent 102 and/or the target agent 104 independently or concurrently at one or more points in time.

The method 400 may begin at block 402, wherein the method 400 may include receiving LiDAR data from the laser projection system 118a, 118b and image data from the camera system 116a, 116b. In an exemplary embodiment, the data reception module 132 of the multi-agent application 106 may be configured to communicate with the laser projection system 118a of the ego agent 102 and/or the laser projection system 118b or the target agent 104 to receive LiDAR data associated with the surrounding multi-agent environment(s) of the ego agent 102 and/or the target agent 104.

As discussed above, the laser projection systems 118a, 118b may be configured to receive one or more reflected laser waves based on the one or more laser beams emitted by the LiDAR transceivers. The one or more reflected laser waves may be reflected off of one or more static objects, one or more dynamic objects, and/or one or more agents that are located within the multi-agent environment. The laser projection systems 118a, 118b may be configured to output LiDAR data associated to one or more reflected laser waves to the data reception module 132.

Additionally, the data reception module 132 may be configured to communicate with the camera system 116a of the ego agent 102 and/or the camera system 116b of the target agent 104 to receive image data associated with the surrounding multi-agent environment(s) of the ego agent 102 and/or the target agent 104. The image data may include image coordinates that may be associated with one or more static objects, one or more dynamic objects, and/or one or more agents that are located within the multi-agent environment. The camera systems 116a, 116b may be configured to output image data associated with the image coordinates associated with the surrounding multi-agent environment(s) of the ego agent 102 and/or the target agent 104 to the data reception module 132.

In an exemplary embodiment, upon receiving the LiDAR data and the image data, the data reception module 132 may be configured to package the data into one or more image-LiDAR data packets. The one or more image-LiDAR data packets may include image data points and LiDAR data points that are contemporaneously sensed (e.g., at one or more simultaneous time steps) by the laser projection systems 118a, 118b and the camera systems 116a, 116b of the respective agents 102, 104.

The method 400 may proceed to block 404, wherein the method 400 may include processing one or more occupancy grids of the surrounding environment of the agents 102, 104. In one embodiment, the data reception module 132 may be configured to communicate the one or more image-LiDAR data packets to the data processing module 134 of the multi-agent application 106. In one or more embodiments, the data processing module 134 may be configured to analyze the LiDAR data included within the image-LiDAR data packets by executing LiDAR logic. In particular, the data processing module 134 may execute the LiDAR logic and may analyze the LiDAR data captured at one or more time steps to determine ego agent LiDAR observations and/or target agent LiDAR observations associated with the surrounding multi-agent environment of the ego agent 102 and/or the target agent 104. In one configuration, the data processing module 134 may be configured to determine ego agent based observations and/or target agent based observations with respect to the lane on which the ego agent 102 is traveling, the lane on which the target agent 104 is traveling, additional lanes included within the multi-agent environment, one or more static objects that may be located within the multi-agent environment, one or more dynamic objects that may be located within the multi-agent environment, and/or one or more additional agents that may be traveling within the multi-agent environment.

In an exemplary embodiment, the data processing module 134 may be configured to analyze the image data included within the image-LiDAR data packets by executing image logic. In particular, the data processing module 134 may execute the image logic and may analyze the image data captured from one or more time steps to determine ego agent image observations and/or target agent image observations associated with the surrounding multi-agent environment of the ego agent 102 and/or the target agent 104. In one configuration, the data processing module 134 may be configured to determine ego agent based observations and/or target agent based observations with respect to the lane on which the ego agent 102 is traveling, the lane on which the target agent 104 is traveling, additional lanes included within the multi-agent environment, one or more static objects that may be located within the multi-agent environment, one or more dynamic objects that may be located within the multi-agent environment, and/or one or more additional agents that may be traveling within the surrounding multi-agent environment of the ego agent 102 and/or the target agent 104.

In an exemplary embodiment, the data processing module 134 may thereby be configured to process one or more occupancy grids that are based on the LiDAR data and the image data processed by the data processing module 134. The one or more occupancy grids may include maps that are representative of the surrounding multi-agent environment of the ego agent 102 and/or the target agent 104. In one configuration, the occupancy grid(s) may be configured as evenly space fields of binary random variables that each represent the presence of the target agent 104 from the ego agent's perspective, the ego agent 102 from the target agent's perspective, one or more static objects that may be located within the multi-agent environment, one or more dynamic objects that may be located within the multi-agent environment, and/or one or more additional agents that may be traveling within the surrounding multi-agent environment of the ego agent 102 and/or the target agent 104. In some configuration, the occupancy grid(s) may be configured as a two-dimensional map(s) that describe the three-dimensional multi-agent environment.

The method 400 may proceed to block 406, wherein the method 400 may include inputting the occupancy grid(s) to the CNN 302. In an exemplary embodiment, the occupancy grid(s) may be configured to cover the sensor range of the ego agent 102 and/or the target agent 104 in a format that may be input and further processed by the CNN 302. The data processing module 134 may thereby communicate with the processor 126 to access the neural network infrastructure 108 and input the occupancy grid(s) to the CNN 302. In one embodiment, the CNN 302 may utilize machine learning/deep learning data processing to process the respective data for the ego agent 102 and/or the target agent 104 and may output processed information associated with the surrounding multi-agent environment of the respective agents 102, 104. Such processed data may include image and LiDAR coordinate data points associated with the location of the agents 102, 104, additional agent, static objects, dynamic objects, and other attributes associated with the surrounding multi-agent environment of the agents 102, 104 (e.g., roadways, curbs, etc.).

Figure 5:
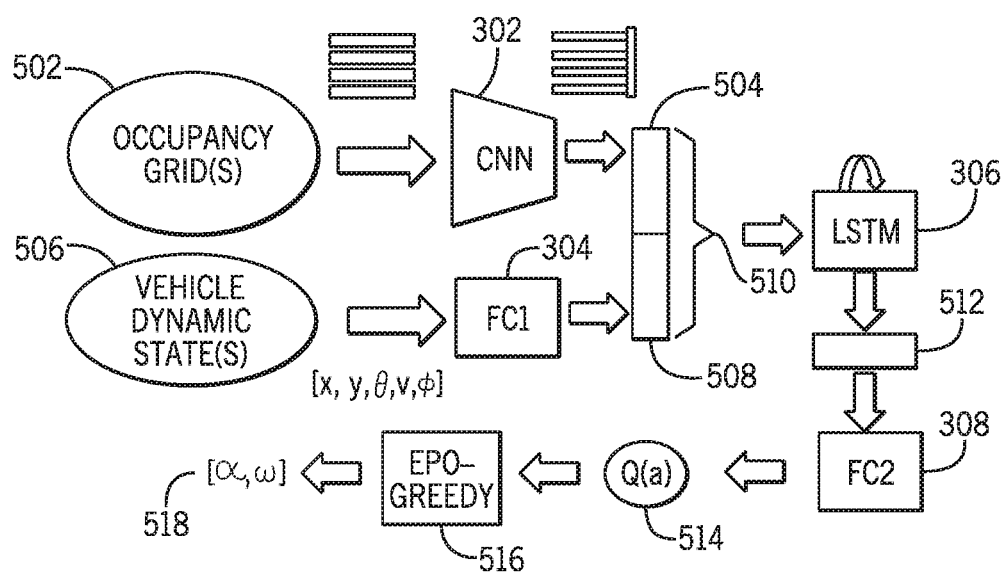
FIG. 5 is a schematic overview of the inputs and outputs provided by neural networks of the neural network infrastructure according to an exemplary embodiment of the present disclosure.

FIG. 5 includes a schematic overview of the inputs and outputs provided by the neural networks of the neural network infrastructure 108 according to an exemplary embodiment of the present disclosure. As shown in FIG. 5, the occupancy grid(s) 502 may be processed by the data processing module 134 and inputted to the CNN 302 to be processed to output processed data 504 that may include image and LiDAR coordinate data points associated with the location of the agents 102, 104, additional agents, static objects, dynamic objects, and other attributes associated with the surrounding multi-agent environment of the agents 102, 104 (e.g., roadways, curbs, etc.).

With continued reference to FIG. 4 and FIG. 5, the method 400 of FIG. 4 may proceed to block 408, wherein the method 400 may include receiving vehicle dynamic data from the vehicle dynamic sensors 120*a*, 120*b*. In an exemplary embodiment, the data reception module 132 of the multi-agent application 106 may be configured to communicate with the vehicle dynamic sensors 120*a* of the ego agent 102 and/or the vehicle dynamic sensors 120*b* of the target agent 104 to receive vehicle dynamic data that is respectively associated with the ego agent 102 and/or the target agent 104. As discussed above, the vehicle dynamic data may include, but may not be limited to, vehicle speed data, vehicle brake force data, vehicle steering speed data, vehicle steering angle data, vehicle throttle angle data, vehicle acceleration data, and the like. As discussed below, upon receipt of the vehicle dynamic data, such data may be packaged in a format that may be inputted to the neural network infrastructure 108 to be processed.

The method 400 may proceed to block 410, wherein the method 400 may include processing one or more vehicle dynamic states that includes a plurality of vehicle dynamic parameters. In one embodiment, upon receiving the vehicle dynamic data from the vehicle dynamic sensors 120*a*, 120*b*, the data reception module 132 may be configured to communicate one or more data packages that includes the vehicle dynamic data to the data processing module 134. In one configuration, upon receiving the vehicle dynamic data, the data processing module 134 may be configured to process one or more vehicle dynamic states 506 that may include a plurality of vehicle dynamic parameters of the respective agents 102, 104. The vehicle dynamic state(s) 506 may include a motion state(s) of the respective agent 102, 104 that may include one or more numeric vehicle data parameters that may be associated with respective vehicle dynamic categories (e.g., speed, yaw rate, acceleration, steering angle rate, steering speed, braking rate, etc.).

The method 400 may proceed to block 412, wherein the method 400 may include inputting the vehicle dynamic state(s) 506 to the first fully connected layer 304. In one embodiment, the vehicle dynamic state(s) 506 may be configured to cover real time dynamic operation of the ego agent 102 and/or the target agent 104 in a format that may be inputted and further processed by the first fully connected layer 314. The data processing module 134 may thereby communicate with the processor 126 to access the neural network infrastructure 108 and input the vehicle dynamic state(s) 506 to the first fully connected layer 314

In particular, data processing module 134 may be configured to input the vehicle dynamic state(s) 506 that may include one or more numeric vehicle data parameters that may be associated with respective vehicle dynamic categories to the first fully connected layer 304. The first fully connected layer 304 may be configured to receive vehicle dynamic state(s) inputted by the data processing module 134 and may be configured to analyze the numeric vehicle dynamic parameters through machine learning/deep learning techniques to output processed data associated with the numeric vehicle dynamic parameters (e.g., packaged data). Accordingly, the first fully connected layer 304 may be configured to output processed data 508 associated with the vehicle dynamic parameters.

With continued reference to FIG. 4 and FIG. 5, upon the data processing module 134 receiving the processed data 504 that may include image and LiDAR coordinate data points output by the CNN 302 (based on the execution of block 406) and the processed data 508 associated with the vehicle dynamic parameters (based on the execution of block 412), the method 400 may proceed to block 414, wherein the method 400 may include concatenating the outputs of the CNN 302 and the first fully connected layer 304. In one embodiment, the data processing module 134 may be configured to concatenate the processed data 504 that may include image and LiDAR coordinate data points output by the CNN 302 and the processed data 508 associated with vehicle dynamic parameters output by the first fully connected layer 304 into agent environmental and dynamic data 510. With respect to the ego agent 102, the agent environmental and dynamic data 510 may include a concatenation of data points that may be associated with the ego agent based observations and ego agent dynamic operations. Similarly, with respect to the target agent 104, the agent environmental and dynamic data 510 may include a concatenation of data points that may be associated with the target agent based observations and target agent dynamic operations.

Figure 6:
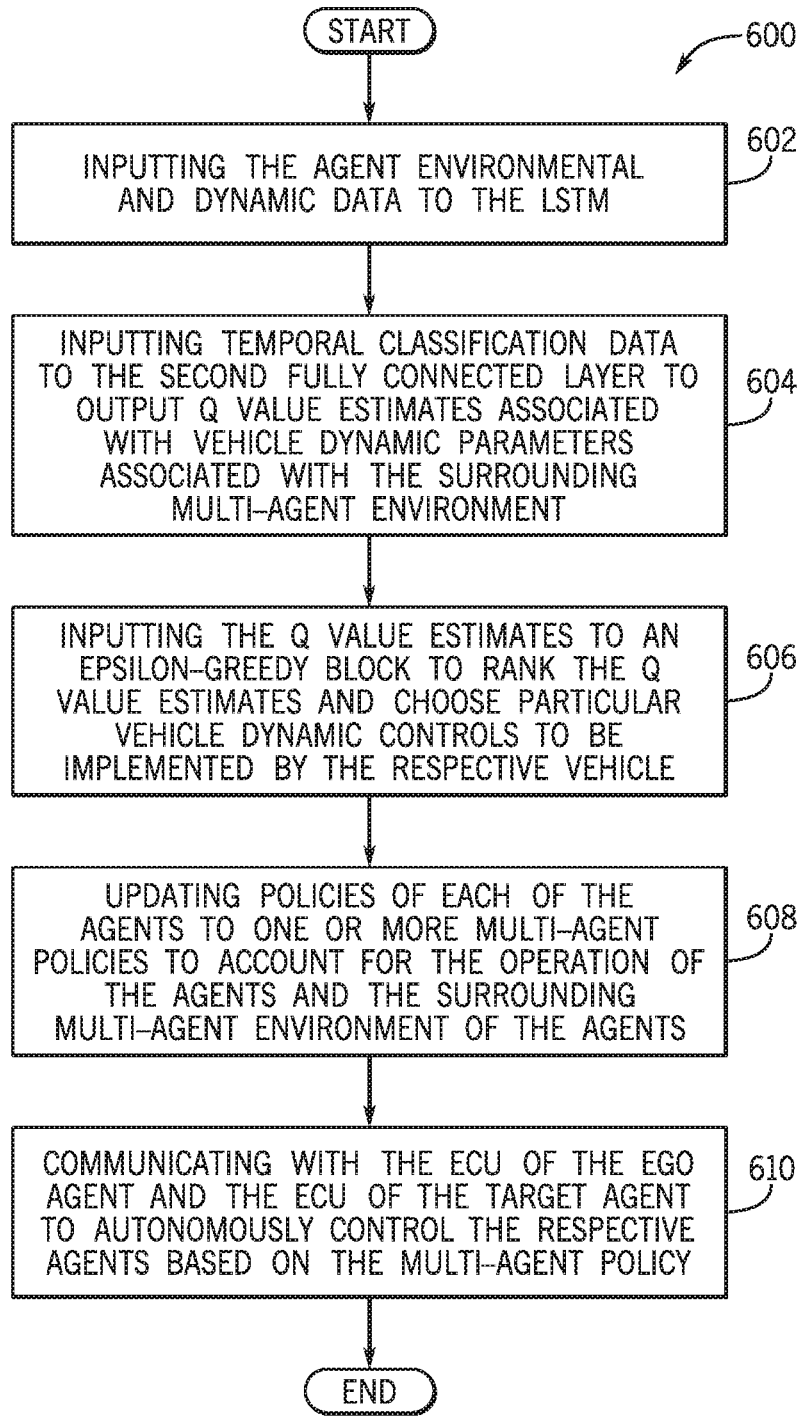
FIG. 6 is a process flow diagram of a method for processing a multi-agent policy and controlling the ego agent and/or the target agent to autonomously operate based on the multi-agent policy within the multi-agent environment.

FIG. 6 is a process flow diagram of a method 600 for processing a multi-agent policy and controlling the ego agent 102 and/or the target agent 104 to autonomously operate based on the multi-agent policy within the multi-agent environment. FIG. 6 will be described with reference to the components of FIG. 1, FIG. 2, FIG. 3, and FIG. 4 though it is to be appreciated that the method of FIG. 6 may be used with other systems/components. It is to be appreciated that the multi-agent application 106 may execute the method 600 for each of the ego agent 102 and/or the target agent 104 independently or concurrently at one or more points in time.

The method 600 may begin at block 602, wherein the method 600 may include inputting the agent environmental and dynamic data 510 to the LSTM 306. In one embodiment, upon concatenating the data points that may be associated with the ego agent based observations and/or target agent based observations and ego agent dynamic operations and/or target agent dynamic operations into the agent environmental and dynamic data 510 (as discussed above with respect to block 414 of the method 400), the data processing module 134 may communicate respective data to the agent policy determinant module 136. The agent environmental and dynamic data 510 may be configured to cover the sensor range and dynamic operations of the ego agent 102 and/or the target agent 104 in a format that may be inputted and further processed by the LSTM 306.

In an exemplary embodiment, the agent policy determinant module 136 may be configured to communicate with the processor 126 to access the neural network infrastructure 108 and input the agent environmental and dynamic data 510 to the LSTM 306. As discussed above, the LSTM 306 may be configured to output a classification and prediction based data associated with a time series. In particular, the agent policy determinant module 136 may be configured to input the environmental and dynamic data to the LSTM 306 to be further processed to recognize patterns in the agent environmental and dynamic data 510. The LSTM 306 may take time and sequence into account and may output temporal classification data 512 associated with the agent environmental and dynamic data 510.

The method 600 may proceed to block 604, wherein the method 600 may include inputting temporal classification data to the second fully connected layer 308 to output Q value estimates 514 associated with vehicle dynamic parameters associated with the surrounding multi-agent environment. In one embodiment, upon receiving the temporal classification data 512 associated with the agent environmental and dynamic data 510 outputted by the LSTM 306, the agent policy determinant module 136 may be configured to communicate with the neural network infrastructure 108 to input the temporal classification data 512 to the second fully connected layer 308.

As discussed above, the second fully connected layer 308 may be configured to analyze the temporal classification data 512 through machine learning/deep learning techniques and output processed data associated with the numeric data parameters in the form of Q value estimates for each numerous autonomous actions that may be performed by the ego agent 102 and/or the target agent 104. As discussed below, the Q value estimates may be further ranked and utilized to determine a single agent policy respectively for the ego agent 102 and/or the target agent 104. The Q value estimates may be utilized as Q value predictions that may be assigned to various agent dynamic operations that may include, but may not be limited to, accelerating, steering angle, steeling velocity, speed selection, braking rate selection, merging, slowing down, stopping, and the like. Accordingly, the second fully connected layer 308 may output the Q value estimates 514 to the agent policy determinant module 136 of the multi-agent application 106 to be further processed through the neural network infrastructure 108.

The method 600 may proceed to block 606, wherein the method 600 may include inputting the Q value estimates to an epsilon-greedy block 516 to rank the Q value estimates and choose particular vehicle dynamic controls to be implemented by the respective agent 102, 104. In an exemplary embodiment, upon receiving the Q value estimates 514 output by the second fully connected layer 308, the agent policy determinant module 136 may be configured to input the Q value estimates to an epsilon-greedy block 516 of the neural network infrastructure 108 to execute an Epsilon greedy policy. The epsilon-greedy block 516 may utilize the processor 126 of the external server 124 to execute the Epsilon greedy policy to rank the Q value estimates and select autonomous actions of the ego agent 102 and/or the target agent 104 based on a uniform distribution and analysis with respect to an epsilon value (e.g., predetermined epsilon value of 0.2) that may be associated with a probability that an autonomous action should occur or is predicted to occur with respect to the agents 102, 104 to successfully navigate the respect agent 102, 104 within its surrounding multi-agent environment.

In one configuration, the epsilon-greedy block 516 may thereby execute the epsilon greedy selection to select one or more autonomous actions (e.g., acceleration and steering velocity) to be executed by the respective agent 102, 104 to successfully navigate the respect agent 102, 104 within its respective surrounding multi-agent environment. The epsilon greedy block 526 may output the one or more autonomous actions 518 to be executed by the respective agent 102, 104. In an exemplary embodiment, the agent policy determinant module 136 may update a single agent policy of the ego agent 102 upon the epsilon greedy selection of one or more autonomous actions 518 to be executed by the ego agent 102. Additionally or alternatively, the agent policy determinant module 136 may update a single agent policy of the target agent 104 upon the epsilon greedy selection of one or more autonomous actions 518 to be executed by the target agent 104.

In an exemplary embodiment, upon updating the single agent policy of the ego agent 102 and/or the target agent 104, the agent policy determinant module 136 may be configured to access the multi-agent machine learning dataset 112 stored on the external server 124. As discussed above, the multi-agent machine learning dataset 112 may be configured as a dataset that includes one or more fields associated with each of the ego agent 102 and the target agent 104. The one or more fields may be configured to store single agent policies that may be associated with the ego agent 102 and the target agent 104 that may be output at one or more points in time.

The method 600 may proceed to block 608, wherein the method 600 may include updating policies of each of the agents 102, 104 to one or more multi agent policies to account for the operation of the agents and the surrounding multi-agent environment of the agents 102, 104. In one embodiment, upon storing the single agent policy associated with the ego agent 102 and/or the target agent 104 upon the respective fields of the multi-agent machine learning dataset 112, the agent policy determinant module 136 may be configured to aggregate the single agent policy associated with one or more particular timestamps of the ego agent 102 with the single agent policy associated with one or more particular timestamps of the target agent 104. In other words, the single agent policies of the ego agent 102 and the target agent 104 may be aggregated by the agent policy determinant module 136 to thereby learn the multi-agent policy that accounts for operation of the ego agent 102 and the target agent 104 with respect to one another, static objects, dynamic objects, and other attributes of and within the multi-agent environment. In one configuration, upon processing the multi-agent policy, the multi-agent policy may be stored upon a respective field(s) of the multi-agent machine learning dataset 112 to be accessed to thereby autonomously control the ego agent 102 and/or the target agent 104.

In alternate embodiment, upon storing the single agent policy associated with the ego agent 102 upon the respective fields of the multi-agent machine learning dataset 112, the agent policy determinant module 136 may be configured to extract one or more dynamic parameter data points that are associated with the ego agent 102 from the single agent policy associated with the ego agent 102. Upon extracting one or more dynamic parameter data points associated with the ego agent 102, the agent policy determinant module 136 may be configured to access the single agent policy of the target agent 104 and update the single agent policy of the target agent 104 with the one or more dynamic parameter data points associated with the ego agent 102. Accordingly, the single agent policy of the target agent 104 may be thereby modified with policy data of the ego agent 102 to thereby learn the multi-agent policy that accounts for operation of the ego agent 102 and the target agent 104 with respect to one another, static objects, dynamic objects, and other attributes of and within the multi-agent environment.

Additionally, upon storing the single agent policy associated with the target agent 104 upon the respective fields of the multi-agent machine learning dataset 112, the agent policy determinant module 136 may be configured to extract one or more dynamic parameter data points that are associated with the target agent 104 from the single agent policy associated with target agent 104. Upon extracting one or more dynamic parameter data points associated with the target agent 104, the agent policy determinant module 136 may be configured to access the single agent policy of the ego agent 102 and update the single agent policy of the ego agent 102 with the one or more dynamic parameter data points associated with the target agent 104. Accordingly, the single agent policy of the ego agent 102 may be thereby modified with policy data of the target agent 104 to thereby learn the multi-agent policy that accounts for operation of the ego agent 102 and the target agent 104 with respect to one another, static objects, dynamic objects, and other attributes of and within the multi-agent environment.

In one or more embodiments, the single agent policy of the ego agent 102 may thereby be converted to learn a multi-agent policy that may be executed to autonomously control the ego agent 102. Additionally, the single agent policy of the target agent 104 may thereby be converted to learn a multi-agent policy that may be executed to autonomously control the target agent 104. Accordingly, the execution of the method 500 and the method 700 to process and learn one or more multi-agent policies may enable periodic vehicle dynamic parameter sharing between the ego agent 102 and the target agent 104 to account for operation of the ego agent 102 and the target agent 104 with respect to one another within the multi-agent environment based on the at least one autonomous action to be executed by the ego agent 102 and/or the target agent 104.

With continued reference to FIG. 6, upon updating the policies of each of the agents 102, 104 to a multi-agent policy, the method 600 may proceed to block 610, wherein the method 600 may include communicating with the ECU 110a of the ego agent 102 and/or the ECU 110b of the target agent 104 to autonomously control the respective agent(s) 102, 104 based on the multi-agent policy. In one embodiment, upon processing of the multi-agent policy that may be executed by the ego agent 102 and/or the target agent 104, the agent policy determinant module 136 may communicate data pertaining to the stored field(s) of the multi-agent machine learning dataset 112 that include the multi-agent policy that may be executed by the ego agent 102 and/or the target agent 104.

In one embodiment, the vehicle control module 138 may thereby access the stored field(s) and retrieve the multi-agent policy that may be executed by the ego agent 102 and/or the target agent 104. The vehicle control module 138 may analyze the multi-agent policy associated with the ego agent 102 and/or the target agent 104 and may thereby communicate with the ECU 110a of the ego agent 102 and/or the ECU 110b of the target agent 104 to control the components of the ego agent 102 and/or the target agent 104 to be autonomously (or semi-autonomously) operated (e.g., driven) within the multi-agent environment according to the respective multi-agent policy.

The ECU(s) 110a, 110b may communicate with one or more of the respective systems/control units (not shown) to thereby control the ego agent 102 and/or the target agent 104 to thereby follow particular pathways at a respective speed(s), acceleration rate(s), steering angle(s), deceleration rate(s), and the like while maneuvering within the multi-agent environment while accounting for operation of the ego agent 102 and the target agent 104 with respect to one another, static objects, dynamic objects, and other attributes of and within the multi-agent environment.

Figure 7:
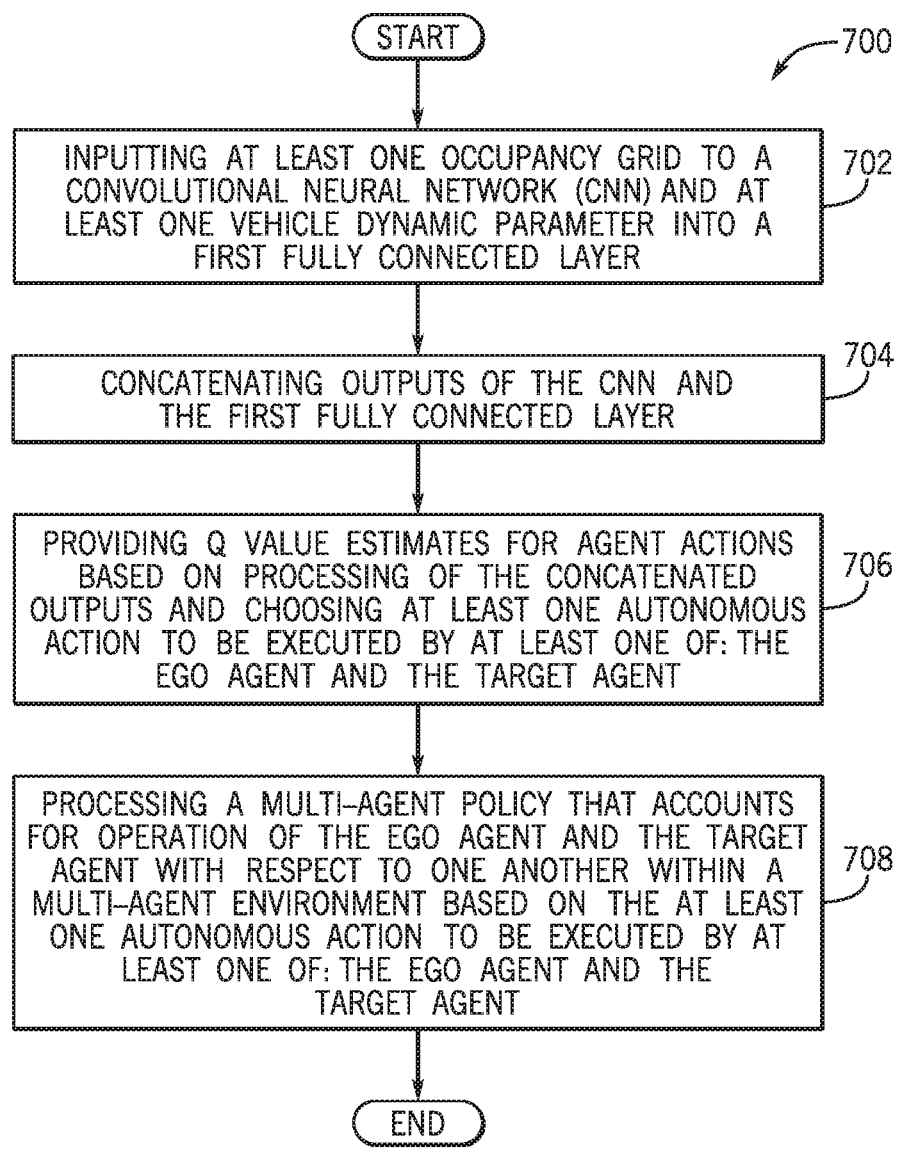
FIG. 7 is a process flow diagram of a method for multi-agent reinforcement learning with periodic parameter sharing according to an exemplary embodiment of the present disclosure.

FIG. 7 is a process flow diagram of a method 700 for multi-agent reinforcement learning with periodic parameter sharing according to an exemplary embodiment of the present disclosure. FIG. 7 will be described with reference to the components of FIG. 1, FIG. 2, FIG. 3, and FIG. 4 though it is to be appreciated that the method of FIG. 7 may be used with other systems/components. The method 700 may begin at block 702, wherein the method 700 may include inputting at least one occupancy grid 502 to a convolutional neural network (CNN) 302 and at least one vehicle dynamic parameter into a first fully connected layer 304. In one embodiment, at least one occupancy grid 502 and the at least one vehicle dynamic parameter are associated with at least one of: an ego agent 102 and a target agent 104.

The method 700 may proceed to block 704, wherein the method 700 may include concatenating outputs of the CNN 302 and the first fully connected layer 304. In one embodiment, concatenated outputs of the first fully connected layer 304 and the CNN 302 are inputted into a long short-term memory unit (LSTM) 306. The method 700 may proceed to block 706, wherein the method 700 may including providing Q value estimates for agent actions and choosing at least one autonomous action to be executed by at least one of: the ego agent 102 and the target agent 104. The method 700 may proceed to block 708, wherein the method 700 may include processing a multi-agent policy that accounts for operation of the ego agent 102 and the target agent 104 with respect to one another within a multi-agent environment based on the at least one autonomous action to be executed by at least one of: the ego agent 102 and the target agent 104.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for multi-agent reinforcement learning with periodic parameter sharing, comprising:
    inputting at least one occupancy grid to a convolutional neural network (CNN) and at least one vehicle dynamic parameter into a first fully connected layer, wherein the at least one occupancy grid and the at least one vehicle dynamic parameter are associated with at least one of: an ego agent and a target agent;
    concatenating outputs of the CNN and the first fully connected layer, wherein the concatenated outputs of the first fully connected layer and the CNN are inputted into a long short-term memory unit (LSTM), wherein the LSTM is configured to output temporal data that includes classification and prediction based data that is associated with a time series that pertains to a multi-agent environment and at least one of: the ego agent and the target agent;
    providing Q value estimates for agent actions based on processing of the concatenated outputs and choosing at least one autonomous action to be executed by at least one of: the ego agent and the target agent; and
    processing a multi-agent policy that accounts for operation of the ego agent and the target agent with respect to one another within the multi-agent environment based on the at least one autonomous action to be executed by at least one of: the ego agent and the target agent.

2. The computer-implemented method of claim 1, wherein inputting at least one occupancy grid includes processing the at least one occupancy grid based on LiDAR data and image data that is sensed by at least one of: the ego agent and the target agent.

3. The computer-implemented method of claim 1, further including processing at least one vehicle dynamic state that includes the at least one vehicle dynamic parameter, wherein the at least vehicle dynamic parameter is based on vehicle dynamic data that is sensed by at least one of: the ego agent and the target agent.

4. The computer-implemented method of claim 1, wherein concatenating the outputs includes concatenating processed data associated with image and LiDAR coordinate points output by the CNN and processed data associated with the at least one vehicle dynamic parameter output by the first fully connected layer into agent environmental and dynamic data that is associated with at least one of: the ego agent and the target agent.

5. The computer-implemented method of claim 4, wherein the agent environmental and dynamic data is inputted to the LSTM to output the temporal classification data.

6. The computer-implemented method of claim 5, wherein providing the Q value estimates for agent actions includes inputting the temporal classification data to a second fully connected layer to output the Q value estimates.

7. The computer-implemented method of claim 6, further including inputting the Q value estimates to an epsilon-greedy block to rank the Q value estimates, wherein the epsilon-greedy block executes an epsilon greedy selection to rank and select at least the one autonomous action to be executed by at least one the ego agent and the target agent.

8. The computer-implemented method of claim 7, wherein processing the multi-agent policy that accounts for operation of the ego agent and the target agent includes processing a single agent policy that is associated with at least one of: the ego agent and the target agent, wherein the single agent policy is based on at least one autonomous action to be executed by at least one of: the ego agent and the target agent.

9. The computer-implemented method of claim 8, wherein processing the multi-agent policy that accounts for operation of the ego agent and the target agent includes extracting data points from the single agent policy that is associated with at least one of: the ego agent and the target agent, wherein the single agent policy that is associated with at least one of: the ego agent and the target agent is updated with the extracted data points and modified to the multi agent policy.

10. A system for multi-agent reinforcement learning with periodic parameter sharing, comprising:
    a memory storing instructions when executed by a processor cause the processor to:
    input at least one occupancy grid to a convolutional neural network (CNN) and at least one vehicle dynamic parameter into a first fully connected layer, wherein the at least one occupancy grid and the at least one vehicle dynamic parameter are associated with at least one of: an ego agent and a target agent;
    concatenate outputs of the CNN and the first fully connected layer, wherein the concatenated outputs of the first fully connected layer and the CNN are inputted into a long short-term memory unit (LSTM), wherein the LSTM is configured to output temporal data that includes classification and prediction based data that is associated with a time series that pertains to a multi-agent environment and at least one of: the ego agent and the target agent;
    provide Q value estimates for agent actions based on processing of the concatenated outputs and choose at least one autonomous action to be executed by at least one of: the ego agent and the target agent; and
    process a multi-agent policy that accounts for operation of the ego agent and the target agent with respect to one another within the multi-agent environment based on the at least one autonomous action to be executed by at least one of: the ego agent and the target agent.

11. The system of claim 10, wherein inputting at least one occupancy grid includes processing the at least one occupancy grid based on LiDAR data and image data that is sensed by at least one of: the ego agent and the target agent.

12. The system of claim 10, further including processing at least one vehicle dynamic state that includes the at least one vehicle dynamic parameter, wherein the at least vehicle dynamic parameter is based on vehicle dynamic data that is sensed by at least one of: the ego agent and the target agent.

13. The system of claim 10, wherein concatenating the outputs includes concatenating processed data associated with image and LiDAR coordinate points output by the CNN and processed data associated with the at least one vehicle dynamic parameter output by the first fully connected layer into agent environmental and dynamic data that is associated with at least one of: the ego agent and the target agent.

14. The system of claim 13, wherein the agent environmental and dynamic data is inputted to the LSTM to output the temporal classification data.

15. The system of claim 14, wherein providing the Q value estimates for agent actions includes inputting the temporal classification data to a second fully connected layer to output the Q value estimates.

16. The system of claim 15, further including inputting the Q value estimates to an epsilon-greedy block to rank the Q value estimates, wherein the epsilon-greedy block executes an epsilon greedy selection to rank and select at least the one autonomous action to be executed by at least one the ego agent and the target agent.

17. The system of claim 16, wherein processing the multi-agent policy that accounts for operation of the ego agent and the target agent includes processing a single agent policy that is associated with at least one of: the ego agent and the target agent, wherein the single agent policy is based on at least one autonomous action to be executed by at least one of: the ego agent and the target agent.

18. The system of claim 17, wherein processing the multi-agent policy that accounts for operation of the ego agent and the target agent includes extracting data points from the single agent policy that is associated with at least one of: the ego agent and the target agent, wherein the single agent policy that is associated with at least one of: the ego agent and the target agent is updated with the extracted data points and modified to the multi agent policy.

19. A non-transitory computer readable storage medium storing instructions that when executed by a computer, which includes a processor perform a method, the method comprising:
  inputting at least one occupancy grid to a convolutional neural network (CNN) and at least one vehicle dynamic parameter into a first fully connected layer, wherein the at least one occupancy grid and the at least one vehicle dynamic parameter are associated with at least one of: an ego agent and a target agent;
  concatenating outputs of the CNN and the first fully connected layer, wherein the concatenated outputs of the first fully connected layer and the CNN are inputted into a long short-term memory unit (LSTM), wherein the LSTM is configured to output temporal data that includes classification and prediction based data that is associated with a time series that pertains to a multi-agent environment and at least one of: the ego agent and the target agent;
  providing Q value estimates for agent actions based on processing of the concatenated outputs and choosing at least one autonomous action to be executed by at least one of: the ego agent and the target agent; and
  processing a multi-agent policy that accounts for operation of the ego agent and the target agent with respect to one another within the multi-agent environment based on the at least one autonomous action to be executed by at least one of: the ego agent and the target agent.

20. The non-transitory computer readable storage medium of claim 19, wherein processing the multi-agent policy that accounts for operation of the ego agent and the target agent includes extracting data points from a single agent policy that is associated with at least one of: the ego agent and the target agent, wherein the single agent policy that is associated with at least one of: the ego agent and the target agent is updated with the extracted data points and modified to the multi agent policy.

* * * * *